United States Patent
Hu et al.

(10) Patent No.: US 11,902,088 B2
(45) Date of Patent: Feb. 13, 2024

(54) METHOD AND SYSTEM FOR SELECTING OPTIMAL EDGE COMPUTING NODE IN INTERNET OF VEHICLE ENVIRONMENT

(71) Applicant: Chang'an University, Xi'an (CN)

(72) Inventors: Hui Hu, Xi'an (CN); Chaofeng Chen, Xi'an (CN); Fuxin Liu, Xi'an (CN); Yanhui Wang, Xi'an (CN); Zhiyu Feng, Xi'an (CN)

(73) Assignee: Chang'an University (CN)

( * ) Notice: Subject to any disclaimer, the term of this patent is extended or adjusted under 35 U.S.C. 154(b) by 0 days.

(21) Appl. No.: 17/755,570

(22) PCT Filed: Mar. 29, 2021

(86) PCT No.: PCT/CN2021/083482
§ 371 (c)(1),
(2) Date: May 2, 2022

(87) PCT Pub. No.: WO2021/197245
PCT Pub. Date: Oct. 7, 2021

(65) Prior Publication Data
US 2023/0040264 A1  Feb. 9, 2023

(30) Foreign Application Priority Data
Mar. 31, 2020  (CN) .......................... 202010247198.9

(51) Int. Cl.
*G06F 15/173*  (2006.01)
*H04L 41/0803*  (2022.01)
(Continued)

(52) U.S. Cl.
CPC ........ *H04L 41/0803* (2013.01); *G06F 9/5027* (2013.01); *G08G 1/0125* (2013.01); *H04L 67/12* (2013.01)

(58) Field of Classification Search
None
See application file for complete search history.

(56) References Cited

U.S. PATENT DOCUMENTS 8,514,825 B1 * 8/2013 Addepalli ............... H04L 45/12
370/338
2011/0164562 A1   7/2011 Qiu et al.
(Continued)

FOREIGN PATENT DOCUMENTS

CN      105321346 A      2/2016
CN      107959708 A      4/2018
(Continued)

*Primary Examiner* — Phuoc H Nguyen
(74) *Attorney, Agent, or Firm* — Lerner David LLP

(57) ABSTRACT

The present disclosure provides a method and system for selecting an optimal edge computing node in an Internet of vehicle (IoV) environment. The method includes: acquiring and analyzing properties of computing tasks of a vehicle in the IoV environment; acquiring and analyzing properties of different edge computing nodes; computing matching degrees between the properties of the computing tasks and the properties of the nodes; analyzing computing demands of different tasks, and assigning weights to different types of matching degrees; and selecting a node having an optimal sum for products of the matching degrees and the weights as an optimal edge computing node to compute each of the computing tasks of the vehicle.

8 Claims, 2 Drawing Sheets

(51) Int. Cl.
G06F 9/50 (2006.01)
G08G 1/01 (2006.01)
H04L 67/12 (2022.01)

(56) References Cited

U.S. PATENT DOCUMENTS

| | | | | |
|---|---|---|---|---|
| 2014/0309806 | A1* | 10/2014 | Ricci | H04W 12/088 |
| | | | | 701/1 |
| 2018/0373268 | A1* | 12/2018 | Antunes Marques Esteves | ......... |
| | | | | H04W 4/023 |
| 2019/0339687 | A1* | 11/2019 | Cella | G05B 13/028 |
| 2023/0186201 | A1* | 6/2023 | Cella | G05B 19/41885 |
| | | | | 705/7.17 |
| 2023/0196230 | A1* | 6/2023 | Cella | G06V 20/176 |
| | | | | 705/7.17 |
| 2023/0269766 | A1* | 8/2023 | Guo | H04W 4/44 |
| | | | | 370/329 |
| 2023/0281527 | A1* | 9/2023 | Cella | G06N 3/088 |
| | | | | 705/7.17 |

FOREIGN PATENT DOCUMENTS

| | | | |
|---|---|---|---|
| CN | 108845885 | A | 11/2018 |
| CN | 109257443 | A | 1/2019 |
| CN | 109831522 | A | 5/2019 |
| CN | 111462487 | A | 7/2020 |

* cited by examiner

METHOD AND SYSTEM FOR SELECTING OPTIMAL EDGE COMPUTING NODE IN INTERNET OF VEHICLE ENVIRONMENT

CROSS REFERENCE TO RELATED APPLICATION

This application claims priority to the Chinese Patent Application No. 202010247198.9, filed with the China National Intellectual Property Administration (CNIPA) on Mar. 31, 2020, and entitled "METHOD AND SYSTEM FOR SELECTING OPTIMAL EDGE COMPUTING NODE IN INTERNET OF VEHICLE ENVIRONMENT", which is incorporated herein by reference in its entirety.

TECHNICAL FIELD

The present disclosure belongs to the technical field of intelligent transportation, relates to a method for selecting an optimal edge computing node, and particularly relates to a method and system for selecting an optimal edge computing node in an Internet of vehicle (IoV) environment.

BACKGROUND ART

At present, the motor vehicle ownership is soaring to present a challenge for the existing urban transportation technologies. IoVs are complicated system engineering and can implement interactions between vehicles and roads as well as between vehicles and environments.

When computing services are provided in IoV environments, there is a need to constantly receive and process data information from sensors on surrounding vehicles and local vehicles, with the huge computational burden; and the computation is hardly implemented on independent vehicle-mounted systems. Breakthroughs have been made by the edge computing, which means that many control procedures are implemented at local devices and unnecessarily handed over to the cloud, and processing procedures are accomplished on local edge computing layers. This will greatly improve the processing efficiency and relieve the load of the cloud. In addition, the edge computing is more accessible to the users, and can further make a faster response to the users and solve the demand at edge terminals.

During actual computation with the edge computing nodes, computing tasks of vehicles vary from each other in data volumes, maximum completion time and numbers of central processing unit (CPU) cycles required for computation, such that computing resources of the computing nodes cannot be allocated reasonably to cause wastes of computing resources and low efficiencies for the computing tasks of the vehicles.

Therefore, there is an urgent need to provide a novel method and system for selecting an optimal edge computing node in the IoV environment.

SUMMARY

An objective of the present disclosure is to provide a method and system for selecting an optimal edge computing node in an IoV environment, to solve the above one or more technical problems. By matching the properties of the computing tasks with the properties of the edge computing nodes, the method of the present disclosure can select the optimal edge computing node to which the vehicle is connected, and the task is offloaded.

In order to achieve the above-mentioned objective, the present disclosure employs the following technical solutions:

The present disclosure provides a method for selecting an optimal edge computing node in an IoV environment, including the following steps:

Step 1: acquiring and analyzing properties of computing tasks of a vehicle in the IoV environment as well as properties of different edge computing nodes;

Step 2: computing matching degrees between the properties of the computing tasks of the vehicle and the properties of the edge computing nodes, where a data volume of each of the computing tasks of the vehicle is matched with data transmission speeds of the edge computing nodes, and a number of CPU cycles required by each of the computing tasks of the vehicle is matched with computing resources allocated by the edge computing nodes;

Step 3: analyzing computing demands of different computing tasks, assigning weights to different types of matching degrees, and computing comprehensive matching degrees; and Step 4: comparing the comprehensive matching degrees in step 3, and selecting an optimal edge computing node according to a comparison result to compute each of the computing tasks of the vehicle.

As a further improvement of the present disclosure, in step 1, D.

The properties of the computing tasks of the vehicle may include: data volumes $D_j$ of the computing tasks, numbers $C_j$ of CPU cycles required by the computing tasks, maximum time $T_j^{max}$ required to complete the tasks, and distances $r_{ij}$ between the vehicle and the nodes; and The properties of the edge computing nodes may include: bandwidths $B_j$ of the edge computing nodes, percentages $b_{ij}$ of time slots allocated by the edge computing nodes to the vehicle in unit time, computing resources $f_{ij}$ allocated by the edge computing nodes to the vehicle, and average signal-to-noise ratios (SNRs)

$$\frac{S}{N}$$

after the edge computing nodes are connected to the vehicle.

As a further improvement of the present disclosure, matching the properties of the tasks with the properties of the nodes in step 2 may specifically include:

Matching the data volume of each of the computing tasks of the vehicle with the data transmission speeds of the edge computing nodes, to obtain matching degrees $$J_{ij} = \frac{t_{ij}^{Smin}}{t_{ij}^{S}}, J_{ij} \in (0,1)$$

between the data volume of each of the computing tasks of the vehicle and the data transmission speeds of the edge computing nodes, Where, the data transmission speeds $v_{ij}$ of the edge computing nodes are computed according to an equation $$v_{ij} = b_{ij}v_j = b_{ij}B_j\log_2\left(1 + \frac{S}{N}\right),$$

$v_j$ being transmission rates corresponding to bandwidths $B_j$ of the edge computing nodes; and transmission time of all base stations for a data volume of each of computing tasks of a vehicle j is computed according to an equation $$t_{ij}^S = \frac{D_j}{v_{ij}}$$

to obtain minimum transmission time $t_{ij}^{S\ min}$ for each of the computing task of the vehicle j, with an equation of $t_{ij}^{S\ min} = \min\{t_{1j}^S, t_{2j}^S, t_{3j}^S \ldots t_{nj}^S\}$;

Matching the number of CPU cycles required by each of the computing tasks of the vehicle with the computing resources allocated by the edge computing nodes, to obtain matching degrees $$K_{ij} = \frac{t_{ij}^{Emin}}{t_{ij}^E}, K_{ij} \in (0, 1)$$

between the number of CPU cycles required by each of the computing tasks of the vehicle and the computing resources allocated by the edge computing nodes, Where, execution time of all base stations for the data volume of each of the computing tasks of the vehicle j is computed according to an equation $$t_{ij}^E = \frac{C_j}{f_{ij}}$$

to obtain minimum transmission time $t_{ij}^{E\ min} = \min\{t_{1j}^E, t_{2j}^E, t_{3j}^E \ldots t_{nj}^E\}$ for each of the computing task of the vehicle j;

Matching maximum completion time for each of the computing tasks of the vehicle with time required by the nodes to compute the task, an equation for computing matching degrees $L_{ij}$ being $$L_{ij} = \frac{T_j^{max} - t_{ij}}{T_j^{max}},$$

Where, time $t_{ij}$ required to complete each of the tasks is computed according to an equation $$t_{ij} = \frac{D_j}{v_{ij}} + \frac{C_j}{f_{ij}};$$

and

Computing matching degrees with the distances $r_{ij}$ between the vehicle and the nodes and a maximum distance $r_{ij}^{max} = \max\{r_{1j}, r_{2j}, r_{3j} \ldots r_{nj}\}$ according to an equation $$R_{ij} = \frac{r_{ij}^{max} - r_{ij}}{r_{ij}^{max}}.$$

As a further improvement of the present disclosure, the assigning weights to different types of matching degrees in step 3 may include:

Respectively computing a mean and a variance for each of $D_j$, $C_j$, $T_j^{max}$ according to the properties $T_j = \{D_j, C_j, T_j^{max}\} j \in M$ of the computing tasks, Where, for the data volumes $D_j$ of the computing tasks and the numbers $C_j$ of CPU cycles required by the computing tasks, the $D_j$ and $C_j$ each have a demand degree $O_D$, $O_C$ of 3 if being greater than or equal to a sum of a mean and a variance thereof; the $D_j$ and $C_j$ each have a demand degree $O_D$, $O_C$ of 2 if being between the sum of the mean and the variance thereof and a difference between the mean and the variance thereof; and the $D_j$ and $C_j$ each have a demand degree $O_D$, $O_C$ of 1 if being less than or equal to the difference between the mean and the variance thereof;

For the maximum time $T_j^{max}$ required to complete the tasks, the $T_j^{max}$ has a demand degree $O_T$ of 3 if being less than or equal to a difference between a mean and a variance thereof; the $T_j^{max}$ has a demand degree $O_T$ of 2 if being between a sum of the mean and the variance thereof and the difference between the mean and the variance thereof; and the $T_j^{max}$ has a demand degree $O_T$ of 1 if being greater than or equal to the sum of the mean and the variance thereof;

Distances toward base stations of the edge computing nodes for each of the computing tasks have a demand degree $O_R$ of 2;

$D_j$, $C_j$, $T_j^{max}$ respectively correspond to a transmission speed demand, an execution speed demand and a task completion time demand, with corresponding matching degrees of $J_{ij}$, $K_{ij}$, $L_{ij}$; and after the demand degrees $O_D$, $O_C$, $O_T$, $O_R$ are obtained, weights $w_R$, $w_J$, $w_K$, $w_L$ are computed according to equations:

$$w_J = \frac{O_D}{O_D + O_C + O_T + O_R}$$

$$w_K = \frac{O_C}{O_D + O_C + O_T + O_R}$$

$$w_L = \frac{O_T}{O_D + O_C + O_T + O_R}$$

$$w_R = \frac{O_R}{O_D + O_C + O_T + O_R},$$

Where, $O_D$, $O_C$, $O_T$, $O_R$ respectively represent the transmission speed demand, the execution speed demand, the task completion time demand and the distance demand, and proportions of the $O_D$, $O_C$, $O_T$, $O_R$ in a total demand are the weights of the matching degrees $J_{ij}$, $K_{ij}$, $L_{ij}$, $R_{ij}$; and An equation for computing comprehensive matching degrees is:

$$Z_{ij} = R_{ij} w_R + J_{ij} w_J + K_{ij} w_K + L_{ij} w_L.$$

As a further improvement of the present disclosure, the comparing the comprehensive matching degrees in step 4 may include:

Matching each of the computing tasks of the vehicle with multiple edge computing nodes, assigning values to weights of different matching degrees, and computing multiple comprehensive matching degrees, Where when the comprehensive matching degrees are compared, if only one maximum value is present among the comprehensive matching degrees for the computing task of the vehicle j, a node where the value is located is selected as an optimal edge computing node for the computing task of the vehicle j.

As a further improvement of the present disclosure, in step 4, when the comprehensive matching degrees are compared, if two or more same maximum values are present among the computed comprehensive matching degrees, a comparison sequence for the matching degrees $J_{ij}$, $K_{ij}$, $L_{ij}$, $R_{ij}$ is determined according to the weights $w_R$, $w_J$, $w_K$, $w_L$, a matching degree having a larger weight is compared first, and a node having a largest matching degree is selected to execute the computing task.

The present disclosure provides a system for selecting an optimal edge computing node in an IoV environment, including:

A property acquisition module, configured to acquire properties of computing tasks of a vehicle in the IoV environment as well as properties of different edge computing nodes, where the properties of the computing tasks of the vehicle include: data volumes $D_j$ of the computing tasks, numbers $C_j$ of CPU cycles required by the computing tasks, maximum time $T_j^{max}$ required to complete the tasks, and distances $r_{ij}$ between the vehicle and the nodes; and the properties of the edge computing nodes include: bandwidths $B_j$ of the edge computing nodes, percentages $b_{ij}$ of time slots allocated by the edge computing nodes to the vehicle in unit time, computing resources $f_{ij}$ allocated by the edge computing nodes to the vehicle, and average SNRs $$\frac{S}{N}$$

after the edge computing nodes are connected to the vehicle;

A matching degree acquisition module, configured to compute matching degrees between the properties of the computing tasks of the vehicle and the properties of the edge computing nodes, where a data volume of each of the computing tasks of the vehicle is matched with the data transmission speeds of the edge computing nodes, and a number of CPU cycles required by each of the computing tasks of the vehicle is matched with the computing resources allocated by the edge computing nodes;

A comprehensive matching degree acquisition module, configured to analyze computing demands of different computing tasks, assign weights to different types of matching degrees, and compute comprehensive matching degrees; and A comparison and selection module, configured to compare the comprehensive matching degrees acquired by the comprehensive matching degree acquisition module, and select an optimal edge computing node according to a comparison result to compute each of the computing tasks of the vehicle.

As a further improvement of the present disclosure, the matching degree acquisition module may include:

A first acquisition module, configured to match the data volume of each of the computing tasks of the vehicle with the data transmission speeds of the edge computing nodes, to obtain matching degrees $$J_{ij} = \frac{t_{ij}^{Smin}}{t_{ij}^{S}}, J_{ij} \in (0, 1)$$

between the data volume of each of the computing tasks of the vehicle and the data transmission speeds of the edge computing nodes, Where, the data transmission speeds $v_{ij}$ of the edge computing nodes are computed according to an equation $$v_{ij} = b_{ij} v_j = b_{ij} B_j \log_2\left(1 + \frac{S}{N}\right);$$

and transmission time of all base stations for a data volume of each of computing tasks of a vehicle j is computed according to an equation $$t_{ij}^S = \frac{D_j}{v_{ij}}$$

to obtain minimum transmission time $t_{ij}^{S\ min}$ for each of the computing tasks of the vehicle j, with an equation of $t_{ij}^{S\ min}$ $\{t_{1j}^S, t_{2j}^S, t_{3j}^S \ldots t_{nj}^S\}$;

A second acquisition module, configured to match the number of CPU cycles required by each of the computing tasks of the vehicle with the computing resources allocated by the edge computing nodes, to obtain matching degrees $$K_{ij} = \frac{t_{ij}^{Emin}}{t_{ij}^{E}}, K_{ij} \in (0, 1)$$

between the number of CPU cycles required by the each of the computing tasks of the vehicle and the computing resources allocated by the edge computing nodes, Where, execution time of all base stations for the data volume of each of the computing tasks of the vehicle j is computed according to an equation $$t_{ij}^E = \frac{C_j}{f_{ij}}$$

to obtain minimum transmission time $t_{ij}^{E\ min}=\text{mm}\ \{t_{1j}^E, t_{2j}^E, t_{3j}^E \ldots t_{nj}^E\}$ for each of the computing tasks of the vehicle j;

A third acquisition module, configured to match maximum completion time for each of the computing tasks of the vehicle with time required by the nodes to compute the task, an equation for computing matching degrees $L_{ij}$ being $$L_{ij} = \frac{T_j^{max} - t_{ij}}{T_j^{max}},$$

Where time $t_{ij}$ required to complete each of the tasks is computed according to an equation $$t_{ij} = \frac{D_j}{v_{ij}} + \frac{C_j}{f_{ij}};$$

and

A fourth acquisition module, configured to compute matching degrees with the distances $r_{ij}$ between the vehicle and the nodes and a maximum distance $r_{ij}^{max}=\max\{r_{1j}, r_{2j}, r_{3j} \ldots r_{nj}\}$ according to an equation $$R_{ij} = \frac{r_{ij}^{max} - r_{ij}}{r_{ij}^{max}}.$$

As a further improvement of the present disclosure, in the matching degree acquisition module, the weights may be assigned to the different types of matching degrees as follows:

Respectively computing a mean and a variance for each of $D_j$, $C_j$, $T_j^{max}$ according to the properties $T_j=\{D_j, C_j, T_j^{max}\}j\in M$ of the computing tasks, Where, for the data volumes $D_j$ of the computing tasks and the numbers $C_j$ of CPU cycles required by the computing tasks, the $D_j$ and $C_j$ each have a demand degree $O_D$, $O_C$ of 3 if being greater than or equal to a sum of a mean and a variance thereof; the $D_j$ and $C_j$ each have a demand degree $O_D$, $O_C$ of 2 if being between the sum of the mean and the variance thereof and a difference between the mean and the variance thereof; and the $D_j$ and $C_j$ each have a demand degree $O_D$, $O_C$ of 1 if being less than or equal to the difference between the mean and the variance thereof;

For the maximum time $T_j^{max}$ required to complete the tasks, the $T_j^{max}$ has a demand degree $O_T$ of 3 if being less than or equal to a difference between a mean and a variance thereof; the $T_j^{max}$ has a demand degree $O_T$ of 2 if being between a sum of the mean and the variance thereof and the difference between the mean and the variance thereof; and $T_j^{max}$ has a demand degree $O_T$ of 1 if being greater than or equal to the sum of the mean and the variance thereof;

Distances toward base stations of the edge computing nodes for the computing tasks have a demand degree $O_R$ of 2;

$D_j$, $C_j$, $T_j^{max}$ respectively correspond to a transmission speed demand, an execution speed demand and a task completion time demand, with corresponding matching degrees of $J_{ij}$, $K_{ij}$, $L_{ij}$; and after the demand degrees, $O_D$, $O_C$, $O_T$, $O_R$ are obtained, weights $w_R$, $w_J$, $w_K$, $w_L$ are computed according to equations:

$$w_J = \frac{O_D}{O_D + O_C + O_T + O_R}$$

$$w_K = \frac{O_C}{O_D + O_C + O_T + O_R}$$

$$w_L = \frac{O_T}{O_D + O_C + O_T + O_R}$$

$$w_R = \frac{O_R}{O_D + O_C + O_T + O_R},$$

Where, $O_D$, $O_C$, $O_T$, $O_R$ respectively represent the transmission speed demand, the execution speed demand, the task completion time demand and the distance demand, and proportions of the $O_D$, $O_C$, $O_T$, $O_R$ in a total demand are the weights of the matching degrees $J_{ij}$, $K_{ij}$, $L_{ij}$, $R_{ij}$; and An equation for computing comprehensive matching degrees is:

$$Z_{ij}=R_{ij}w_R+J_{ij}w_J+K_{ij}w_K+L_{ij}w_L.$$

As a further improvement of the present disclosure, in the comprehensive matching degree acquisition module, the comprehensive matching degrees may be compared as follows:

Matching each of the computing tasks of the vehicle with multiple edge computing nodes, assigning values to weights of different matching degrees, and computing multiple comprehensive matching degrees, Where when the comprehensive matching degrees are compared, if only one maximum value is present among the comprehensive matching degrees for the computing task of the vehicle j, a node where the value is located is selected as an optimal edge computing node for the computing task of the vehicle j; and if two or more same maximum values are present among the computed comprehensive matching degrees, a comparison sequence for the matching degrees $J_{ij}$, $K_{ij}$, $L_{ij}$, $R_{ij}$ is determined according to the weights $w_R$, $w_J$, $w_K$, $w_L$, a matching degree having a larger weight is compared first, and a node having a largest matching degree is selected to execute the computing task.

The present disclosure has the following beneficial effects over the prior art:

Methods in the prior art typically execute the computing task by selecting the edge computing node within the range with a random selection or nearest selection method, which easily causes a waste of resources of the edge computing nodes, or overcrowding of some edge computing nodes. The present disclosure selects the edge computing nodes according to the matching degrees between the computing tasks and the nodes, such that the computing resources of the edge computing nodes can be allocated and utilized reasonably, the waste of the computing resources of the nodes or the extension of the computing time caused by overcrowded tasks of the nodes is avoided, and the computing efficiency is effectively improved. The method can quickly match the properties of the computing tasks of the vehicle with the properties of the nodes in the IoV environment, can reduce the complexity of selecting the edge computing node and can improve the computing efficiency.

The method can quickly select the optimal edge computing node for the computing task of the vehicle according to different computing demands and matching results, improve the computing efficiency, meet the computing requirements and save the computing resources of the nodes.

The system can quickly match the properties of the computing tasks of the vehicle with the properties of the nodes in the IoV environment, reduce the selection complexity and improve the computing efficiency.

BRIEF DESCRIPTION OF THE DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show some embodiments of the present disclosure, and a person of ordinary skill in the art may still derive other drawings from these accompanying drawings without creative efforts.

DETAILED DESCRIPTION OF THE EMBODIMENTS

In order to make the objectives, technical solutions and technical solutions in the embodiments of the present disclosure more clear, the technical solutions in the embodiments of the present disclosure will be clearly and completely described below in conjunction with the accompanying drawings in the embodiments of the present disclosure. Obviously, the described embodiments are some of the embodiments of the present disclosure. All other embodiments obtained by the person of ordinary skill in the art based on the embodiments of the present disclosure without creative efforts should fall within the protection scope of the present disclosure.

Figure 1:
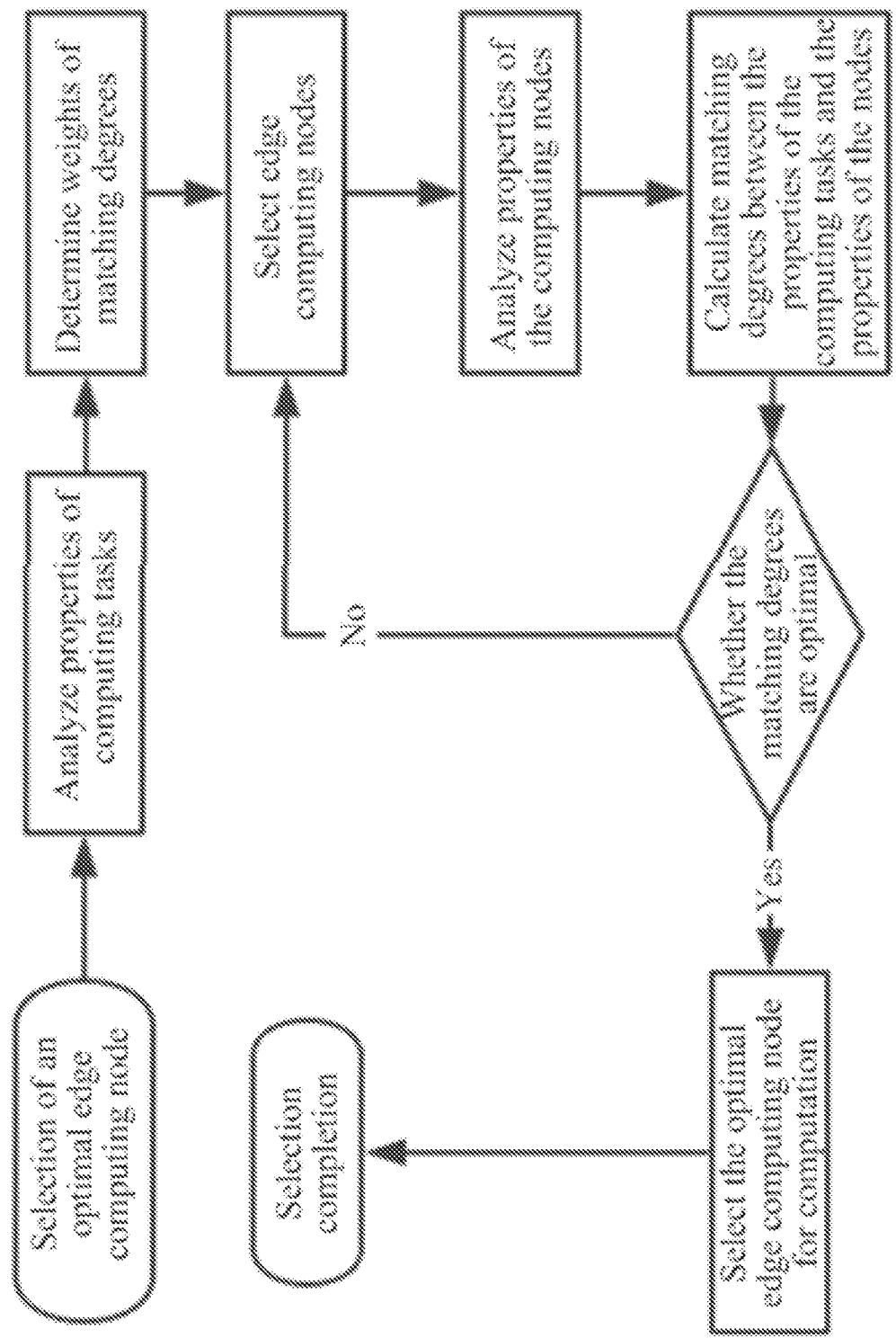
FIG. 1 is a flow chart of a method for selecting an optimal edge computing node in an IoV environment according to an embodiment of the present disclosure.

Referring to FIG. 1, the embodiment of the present disclosure provides a method for selecting an optimal edge computing node in an IoV environment, specifically including the following steps:

Acquire and analyze properties of computing tasks of a vehicle in the IoV environment; and acquire and analyze properties of different edge computing nodes.

Compute matching degrees between the properties of the tasks and the properties of the nodes after the properties of the computing tasks of the vehicle and the properties of the edge computing nodes are acquired.

Analyze computing demands of different computing tasks, assign weights to different types of matching degrees, and compute comprehensive matching degrees.

Compare the comprehensive matching degrees, determine a comparison sequence for the matching degrees according to the demands of the computing tasks if the comprehensive matching degrees are the same, and select an optimal edge computing node to compute each of the computing tasks of the vehicle.

Preferably, the step of acquiring properties of computing tasks of a vehicle and properties of edge computing nodes specifically includes:

The properties of the computing tasks of the vehicle include: data volumes $D_j$ of the computing tasks, numbers $C_j$ of CPU cycles required by the computing tasks, maximum time $T_j^{max}$ required to complete the tasks, and distances $r_{ij}$ between the vehicle and the nodes.

The properties of the edge computing nodes include: bandwidths $B_j$ of the edge computing nodes, percentages $b_{ij}$ of time slots allocated by the edge computing nodes to the vehicle in unit time, computing resources $f_{ij}$ allocated by the edge computing nodes to the vehicle, and average SNRs $$\frac{S}{N}$$

after the edge computing nodes are connected to the vehicle.

Figure 2:
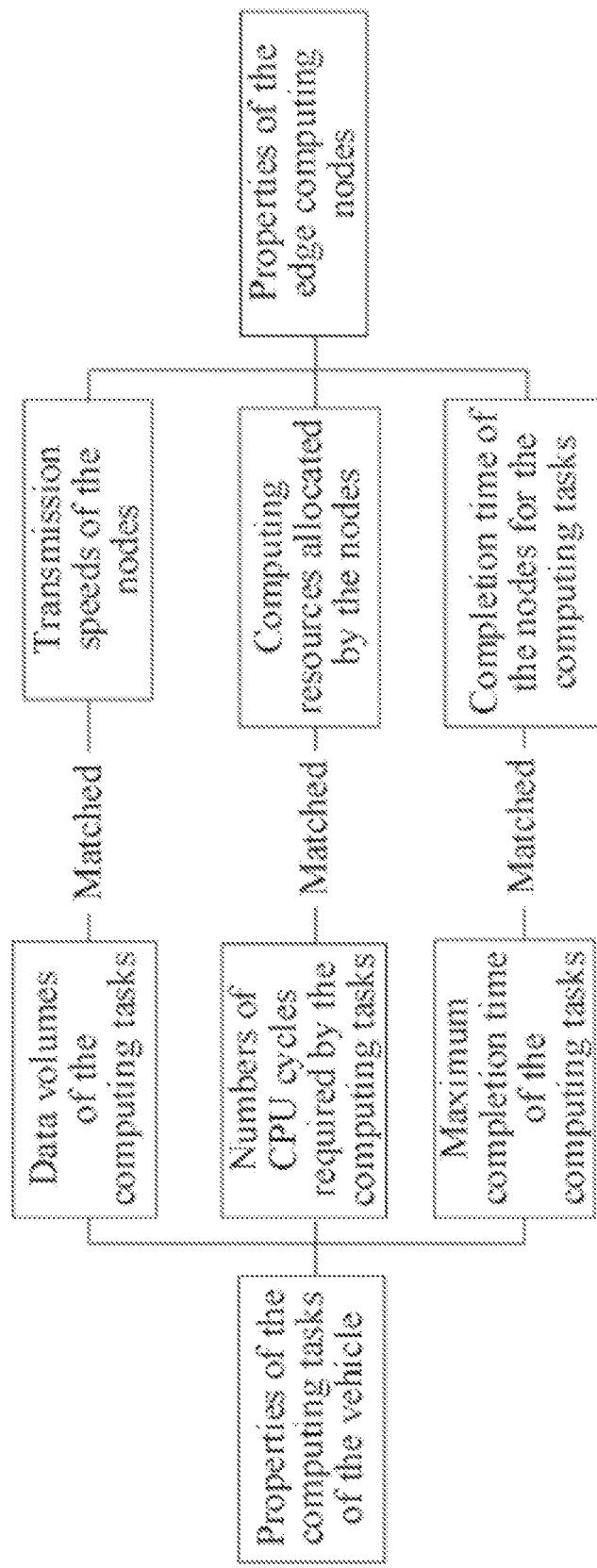
FIG. 2 is a schematic view for selecting and matching an optimal edge computing node in an IoV environment according to an embodiment of the present disclosure.

Referring to FIG. 2, preferably, the step of matching the properties of the computing tasks of the vehicle with the properties of the edge computing nodes specifically includes:

Match a data volume of each of the computing tasks of the vehicle with data transmission speeds of the edge computing nodes, where the data transmission speeds $v_{ij}$ of the edge computing nodes are computed through the bandwidths $B_j$ of the edge computing nodes, the average SNRs $$\frac{S}{N}$$

after the edge computing nodes are connected to the vehicle and the percentages $b_{ij}$ of the time slots allocated by the edge computing nodes to the vehicle in the unit time according to an equation $$v_{ij} = b_{ij}v_j = b_{ij}B_j \log_2\left(1 + \frac{S}{N}\right),$$

and transmission time of all base stations for a data volume of each of computing tasks of a vehicle j is computed according to an equation $$t_{ij}^S = \frac{D_j}{v_{ij}}$$

to obtain minimum transmission time $t_{ij}^{S\ min}$ for each of the computing tasks of the vehicle j, $t_{ij}^{S\ min} = \min\{t_{1j}^S, t_{2j}^S, t_{3j}^S \ldots t_{nj}^S\}$. Therefore, matching degrees $$J_{ij} = \frac{t_{ij}^{Smin}}{t_{ij}^S}, J_{ij} \in (0, 1)$$

between the data volume of each of the computing tasks of the vehicle and the data transmission speeds of the edge computing nodes are obtained.

Match a number of CPU cycles required by each of the computing tasks of the vehicle with the computing resources allocated by the edge computing nodes, and compute execution time of all base station for the data volume of each of the computing tasks of the vehicle j according to an equation $$t_{ij}^E = \frac{C_j}{f_{ij}}$$

to obtain minimum transmission time $t_{ij}E\ min = \min\{t_{1j}^E, t_{2j}^E, t_{3j}^E \ldots t_{nj}^E\}$ for each of the computing tasks of the vehicle j. Therefore, matching degrees $$K_{ij} = \frac{t_{ij}^{Emin}}{t_{ij}^E}, K_{ij} \in (0, 1)$$

between the number of CPU cycles required by each of the computing tasks of the vehicle and the computing resources allocated by the edge computing nodes are obtained.

Match the maximum completion time for each of the computing tasks of the vehicle with time required by the nodes to compute the task, where time $t_{ij}$ required to complete each of the tasks is computed according to an equation $$t_{ij} = \frac{D_j}{v_{ij}} + \frac{C_j}{f_{ij}},$$

and matching degrees $L_{ij}$ are computed according to an equation $$L_{ij} = \frac{T_j^{max} - t_{ij}}{T_j^{max}}.$$

Compute matching degrees $$R_{ij} = \frac{r_{ij}^{max} - r_{ij}}{r_{ij}^{max}}$$

with the distances $r_{ij}$ between the vehicle and the nodes and a maximum distance $r_{ij}^{max} = \max\{r_{1j}, r_{2j}, r_{3j} \ldots r_{nj}\}$.

In the embodiment of the present disclosure, the weights are assigned as follows:

Respectively compute a mean and a variance for each of $D_j$, $C_j$, $T_j^{max}$ according to the properties $T_j=\{D_j, C_j, T_j^{max}\}|j \in M$ of the computing tasks, classify task demand degrees $O_D$, $O_C$, $O_T$, $O_R$, and respectively assign values to $w_R$, $w_J$, $w_K$, $w_L$ according to a result.

For the data volumes $D_j$ of the computing tasks and the numbers $C_j$ of CPU cycles required by the computing tasks, the $D_j$ and $C_j$ each have a demand degree $O_D$, $O_C$ of 3 if being greater than a sum of a mean and a variance thereof; the $D_j$ and $C_j$ each have a demand degree $O_D$, $O_C$ of 2 if being between the sum of the mean and the variance thereof and a difference between the mean and the variance thereof; and the $D_j$ and $C_j$ each have a demand degree $O_D$, $O_C$ of 1 if being less than the difference between the mean and the variance thereof.

For the maximum time $T_j^{max}$ required to complete the tasks, the $T_j^{max}$ has a demand degree $O_T$ of 3 if being less than a difference between a mean and a variance thereof; the $T_j^{max}$ has a demand degree $O_T$ of 2 if being between a sum of the mean and the variance thereof and the difference between the mean and the variance thereof; and the $T_j^{max}$ has a demand degree $O_T$ of 1 if being greater than the sum of the mean and the variance thereof.

$D_j$, $C_j$, $T_j^{max}$ respectively correspond to a transmission speed demand, an execution speed demand and a task completion time demand, with corresponding matching degrees of $J_{ij}$, $K_{ij}$, $L_{ij}$; and after the demand degrees $O_D$, $O_C$, $O_T$, $O_R$ are obtained, weights $w_R$, $w_J$, $w_K$, $w_L$ are computed.

In the embodiment of the present disclosure, the matching degrees are compared as follows:

Match each of the computing tasks of the vehicle with multiple edge computing nodes, assign values to weights of different matching degrees, and compute multiple comprehensive matching degrees $Z_{ij}=R_{ij}w_R+J_{ij}w_J+K_{ij}w_K+L_{ij}w_L$.

The optimal edge computing node is selected by comparing computation results:

(1) When the comprehensive matching degrees $Z_{ij}$ are compared, if only one maximum value is present among the comprehensive matching degrees $Z_{ij}$ for the computing task of the vehicle j, a node where the value is located is selected as an optimal edge computing node for the computing task of the vehicle j.

For example, after matching with the edge computing nodes, the computing task of the vehicle j has the comprehensive matching degree $Z_{i_1j}=\max\{Z_{1j}, Z_{2j}, Z_{3j} \ldots Z_{nj}\}$, $j \in M$, and then the edge computing node $i_1$ is selected to execute the computing task of the vehicle j.

(2) If two or more same maximum values are present among the computed comprehensive matching degrees $Z_{ij}$, nodes where the maximum values of the matching degrees are located are further compared for selection, namely, a comparison sequence for the matching degrees $J_{ij}$, $K_{ij}$, $L_{ij}$, $R_{ij}$ is determined according to the weights $w_R$, $w_J$, $w_K$, $w_L$, a matching degree having a larger weight is compared first, and a node having a largest matching degree is selected to execute the computing task.

For example, the computing task of the vehicle j is matched with the nodes to obtain the computation result $Z_{i_1j}=Z_{i_2j}=\max\{Z_{1j}, Z_{2j} \ldots Z_{nj}\}$, $j \in M$, and then $i_1$ and $i_2$ are further compared. If $w_J=\max\{w_R, w_J, w_K, w_L\}$, the matching degrees $J_{i_1j}$, $J_{i_2j}$ are compared, and the node where the maximum value of the i is located is selected to execute the computing task of the vehicle j.

Specific Embodiment

The embodiment of the present disclosure provides a method for selecting an optimal edge computing node in an IoV environment. In actual applications, base stations of the edge computing nodes have the overlapped coverages, and different computing nodes are interfered with each other, thus reducing the transmission rate. Each of the edge computing nodes is provided with one base station. Base stations of the different nodes are connected in a wired manner. The set for the edge computing nodes is represented by $N=\{1\ 2\ 3 \ldots n\}$, while the set for the computing tasks of the vehicle is represented by $M=\{1,2,3 \ldots m\}$.

The computing task of the vehicle j has a property of $T_j=\{D_j, C_j, T_j^{max}\}$, where $D_j$ represents a data volume of the computing task, $C_j$ represents a number of CPU cycles required by a server in a base station to compute the task, and $T_j^{max}$ represents maximum time required to complete the task.

The matching degree $J_{ij}$ between the data volume of the task and the transmission speed of the node is:

The data volume $D_j$ of the computing task is matched with the transmission speed $v_{ij}$ of the connected edge computing node j to obtain the matching degree $J_{ij}$.

Each edge computing node is provided with a server. After accessed to the base station, the vehicle can offload the computing task to the server of the edge computing node for computation. The vehicle communicates with the base stations through time division multiple address (TDMA). Each vehicle uploads data with a time slot allocated by the base station, where $b_{ij}$ represents a percentage of the time slot of the vehicle j in unit time after the vehicle is accessed to the base station i, and therefore, $0<b_{ij}<1$ $i \in N$, $j \in M$.

Supposing that the base station has a bandwidth of B, the total transmission rate of the base station is:

$$v = B\log_2\left(1 + \frac{S}{N}\right) \quad (1)$$

Where, S is an average signal power, N is an average noise power, and $$\frac{S}{N}$$

is an SNR.

When the vehicle j is accessed to the base station i, the transmission rate between the vehicle and the accessed base station is:

$$v_{ij} = b_{ij}v_j = b_{ij}B_j\log_2\left(1 + \frac{S}{N}\right), i \in N, j \in M \quad (2)$$

The transmission time $t_{ij}^s$ is:

$$t_{ij}^S = \frac{D_j}{v_{ij}}, i \in N, j \in M \quad (3)$$

Transmission time of all base stations for the data volume of the computing task of the vehicle j is computed to obtain minimum transmission time $t_{ij}^{S\ min}$ for the computing task of the vehicle j, $t_{ij}S\ min=\min\{t_{1j}^S, t_{2j}^S, t_{3j}^S \ldots t_{nj}^S\}$. Therefore, the matching degree $J_{ij}$ between the data volume of the task and the transmission speed of the node is obtained:

$$J_{ij} = \frac{t_{ij}^{Smin}}{t_{ij}^S}, J_{ij} \in (0, 1) \qquad (4)$$

In the embodiment of the present disclosure, the matching degree $K_{ij}$ between the number of CPU cycles of the computing task and the computing resource allocated by the node is obtained with the following specific steps:

The computing resource of the server of the edge computing node is generally balanced by the CPU frequency; and the server allocates different virtual machines to different vehicles to implement the resource allocation for the CPU frequency. The computing resource of the server is represented by $F=\{F_1, F_2, F_3 \ldots F_n\}$, where $F_i$ represents the computing resource at the base station i, and $f_{ij}$ represents the CPU frequency allocated by the server of the base station i to the vehicle j; and thus the execution time of the computing task is:

$$t_{ij}^E = \frac{C_j}{f_{ij}}, \sum_{j=1}^m f_{ij} \leq F_i \qquad (5)$$

Execution time of all base stations for the data volume of the computing task of the vehicle j is computed to obtain minimum transmission time $t_{ij}^{E\ min}$ for the computing task of the vehicle j, $t_{ij}^{E\ min}=\min\{t_{1j}^E, t_{2j}^E, t_{3j}^E \ldots t_{nj}^E\}$. Therefore, the matching degree $K_{ij}$ between the number of CPU cycles of the computing task and the computing resource allocated by the node is obtained:

$$K_{ij} = \frac{t_{ij}^{Emin}}{t_{ij}^E}, K_{ij} \in (0, 1) \qquad (6)$$

In the embodiment of the present disclosure, the matching degree $L_{ij}$ between the maximum completion time of the task and the time required by the node to compute the task is obtained with the following specific steps:

The time $t_{ij}$ required by the node to compute the task can be obtained through the matching degrees $J_{ij}$, $K_{ij}$:

$$t_{ij} = \frac{D_j}{v_{ij}} + \frac{C_j}{f_{ij}} \qquad (7)$$

The matching degree $L_{ij}$ between the time $t_{ij}$ required by the node i to compute the task of the vehicle j and the maximum task completion time $T_j^{max}$ can be obtained:

$$L_{ij} = \frac{T_j^{max} - t_{ij}}{T_j^{max}}, T_j^{max} \geq t_{ij}, L_{ij} \in (0, 1) \qquad (8)$$

In the embodiment of the present disclosure, the distance matching degree $R_{ij}$ between the vehicle and node is obtained with the following specific steps:

As the distance between the base station of the node and the vehicle affects the connecting node of the vehicle, the matching degree $R_{ij}$ is computed with the distance $r_{ij}$ (km) between the vehicle and the node and the maximum distance $r_{ij}^{max}=\max\{r_{1j}, r_{2j}, r_{3j} \ldots r_{nj}\}$ $$R_{ij} = \frac{r_{ij}^{max} - r_{ij}}{r_{ij}^{max}}, R_{ij} \in (0, 1) \qquad (9)$$

In the present disclosure, the demand degrees and weights of the computing tasks of the vehicle are computed with the following specific steps:

$D_j$, $C_j$, $T_j^{max}$ respectively correspond to a transmission speed demand, an execution speed demand and a task completion time demand, with corresponding matching degrees $J_{ij}$, $K_{ij}$, $L_{ij}$, a mean and a variance for each of the $D_j$, $C_j$, $T_j^{max}$ are computed, the task demand degrees $O_D$, $O_C$, $O_T$, $O_R$ are classified, and values are assigned to $w_R$, $w_J$, $w_K$, $w_L$ according to the result, specifically:

For the data volume $D_j$ of the computing task and the number $C_j$ of CPU cycles required by the computing task, the $D_j$ and $C_j$ each have a demand degree $O_D$, $O_C$ of 3 if being greater than a sum of a mean and a variance thereof; the $D_j$ and $C_j$ each have a demand degree $O_D$, $O_C$ of 2 if being between the sum of the mean and the variance thereof and a difference between the mean and the variance thereof; and the $D_j$ and $C_j$ each have a demand degree $O_D$, $O_C$ of 1 if being less than the difference between the mean and the variance thereof.

For the maximum time $T_j^{max}$ required to complete the task, the $T_j^{max}$ has a demand degree $O_T$ of 3 if being less than a difference between a mean and a variance thereof; has a demand degree $O_T$ of 2 if being between a sum of the mean and the variance thereof and the difference between the mean and the variance thereof; and has a demand degree $O_T$ of 1 if being greater than the sum of the mean and the variance thereof.

The distance toward the base station of the edge computing node for the computing task has a demand degree $O_R$ of 2.

After the demand degrees $O_D$, $O_C$, $O_T$, $O_R$ are obtained, weights $w_R$, $w_J$, $w_K$, $w_L$ are computed:

$$w_J = \frac{O_D}{O_D + O_C + O_T + O_R} \qquad (10)$$

$$w_K = \frac{O_C}{O_D + O_C + O_T + O_R} \qquad (11)$$

$$w_L = \frac{O_T}{O_D + O_C + O_T + O_R} \qquad (12)$$

$$w_R = \frac{O_R}{O_D + O_C + O_T + O_R} \qquad (13)$$

In the embodiment of the present disclosure, the optimal edge computing node is selected as follows:

Each computing task of the vehicle is matched with multiple edge computing nodes, values are assigned to different matching degrees, and multiple comprehensive matching degrees $Z_{ij}$ are computed.

$$Z_{ij}=R_{ij}w_R+J_{ij}w_J+K_{ij}w_K+L_{ij}w_L, Z_{ij} \in (0,1) \qquad (14)$$

The optimal edge computing node is selected by comparing the computation results:

(1) When the comprehensive matching degrees $Z_{ij}$ are compared, if only one maximum value is present among the comprehensive matching degrees $Z_{ij}$ for the computing task of the vehicle j, a node where the value is located is selected as an optimal edge computing node for the computing task of the vehicle j.

For example, after matching with the edge computing nodes, the computing task of the vehicle j has the comprehensive matching degree $Z_{i_1j}=\max\{Z_{1j}, Z_{2j}, Z_{3j} \ldots Z_{nj}\}$, $j \in M$, and then the edge computing node $i_1$ is selected to execute the computing task of the vehicle j.

(2) If two or more same maximum values are present among the computed comprehensive matching degrees $Z_{ij}$, nodes where the maximum values of the matching degrees are located are further compared for selection, namely, a comparison sequence for the matching degrees $J_{ij}$, $K_{ij}$, $L_{ij}$, $R_{ij}$ is determined according to the weights $w_R$, $w_J$, $w_K$, $w_L$, a matching degree having a larger weight is compared first, and a node having a largest matching degree is selected to execute the computing task.

For example, the computing task of the vehicle j is matched with the nodes to obtain the computation result $Z_{i_1j}=Z_{i_2j}=\max\{Z_{1j}, Z_{2j} \ldots Z_{nj}\}$, $j \in M$; and then $i_1$ and $i_2$ are further compared. If $w_J=\max\{w_R, w_J, w_K, w_L\}$, the matching degrees $J_{i_1j}$, $J_{i_2j}$ are compared, and the node where the maximum value of the is located is selected to execute the computing task of the vehicle j.

The method can quickly select the optimal edge computing node for the computing task of the vehicle according to different computing demands and matching results, improve the computing efficiency, meet the computing requirements and save the computing resources of the nodes.

To sum up, the present disclosure provides the method for selecting an optimal edge computing node in an IoV environment, including the following steps: step 1: analyzing properties of different computing tasks and edge computing nodes, including but not limited to data volumes of the computing tasks, numbers of CPU cycles and computing time required by the computing tasks, and bandwidths and computing resources of the edge computing nodes; step 2: computing matching degrees of different properties, and quantizing matching degrees of different computing demands through the properties of the computing tasks of the vehicles and the properties of the computing nodes: distance matching between the vehicle and base stations of the nodes; matching between computation burdens of the computing tasks and transmission speeds of the nodes; matching between computing resources required by the computing tasks and computing resources allocated by base stations of the nodes to the tasks (the number of CPU cycles); and matching between time demands of the computing tasks and time of the nodes to compute the tasks; and step 3: determining different demand degrees of the computing tasks through different properties of the computing tasks, assigning different weights to different matching degrees, obtaining sums of comprehensive matching degrees, and selecting an edge computing node having a largest matching degree as an optimal edge computing node. The present disclosure can quickly match the properties of the computing tasks of the vehicle with the properties of the nodes in the IoV environment, quickly select the optimal edge computing node for the computing task of the vehicle according to different computing demands and matching results, improve the computing efficiency, meet the computing requirements and save the computing resources of the nodes.

The above embodiments are provided merely for an objective of describing the present disclosure and are not intended to limit the scope of the present disclosure. The scope of the present disclosure is defined by the appended claims. Various equivalent replacements and modifications made without departing from the spirit and scope of the present disclosure should all fall within the scope of the present disclosure.

What is claimed is:

1. A method for selecting an optimal edge computing node in an Internet of vehicle (IoV) environment, comprising the following steps:
   step 1: acquiring and analyzing properties of computing tasks of a vehicle in the IoV environment as well as properties of different edge computing nodes;
   step 2: computing matching degrees between the properties of the computing tasks of the vehicle and the properties of the edge computing nodes, wherein a data volume of each of the computing tasks of the vehicle is matched with data transmission speeds of the edge computing nodes, and a number of central processing unit (CPU) cycles required by each of the computing tasks of the vehicle is matched with computing resources allocated by the edge computing nodes;
   step 3: analyzing computing demands of different computing tasks, assigning weights to different types of matching degrees, and computing comprehensive matching degrees; and
   step 4: comparing the comprehensive matching degrees in step 3, and selecting an optimal edge computing node according to a comparison result to compute each of the computing tasks of the vehicle,
   wherein, in step 1, the properties of the computing tasks of the vehicle comprise: data volumes $D_j$ of the computing tasks, numbers $C_j$ of CPU cycles required by the computing tasks, maximum time $T_j^{max}$ required to complete the tasks, and distances $r_{ij}$ between the vehicle and the nodes;
   the properties of the edge computing nodes comprise bandwidths $B_j$ of the edge computing nodes, percentages $b_{ij}$ of time slots allocated by the edge computing nodes to the vehicle in unit time, computing resources $f_{ij}$ allocated by the edge computing nodes to the vehicle, and average signal-to-noise ratios (SNRs)

$$\frac{S}{N}$$

after the edge computing nodes are connected to the vehicle;
   wherein matching the properties of the tasks with the properties of the nodes in step 2 specifically comprises:
   matching the data volume of each of the computing tasks of the vehicle with the data transmission speeds of the edge computing nodes, to obtain matching degrees $$J_{ij} = \frac{t_{ij}^{Smin}}{t_{ij}^{S}}, J_{ij} \in (0, 1)$$

between the data volume of each of the computing tasks of the vehicle and the data transmission speeds of the edge computing nodes,
   wherein, the data transmission speeds $v_{ij}$ of the edge computing nodes are computed according to an equation $$v_{ij} = b_{ij}v_j = b_{ij}B_j\log_2\left(1+\frac{S}{N}\right)$$

and transmission time of all base stations for a data volume of each of computing tasks of a vehicle j is computed according to an equation $$t_{ij}^S = \frac{D_j}{v_{ij}}$$

to obtain minimum transmission time $t_{ij}^{S\ min}$ for each of the computing task of the vehicle j, with an equation of $t_{ij}^{S\ min} = \min\{t_{1j}^S, t_{2j}^S, t_{3j}^S \ldots t_{nj}^S\}$;

matching the number of CPU cycles required by each of the computing tasks of the vehicle with the computing resources allocated by the edge computing nodes, to obtain matching degrees $$K_{ij} = \frac{t_{ij}^{Emin}}{t_{ij}^E}, K_{ij} \in (0, 1)$$

between the number of CPU cycles required by each of the computing tasks of the vehicle and the computing resources allocated by the edge computing nodes, wherein execution time of all base stations for the data volume of each of the computing tasks of the vehicle j is computed according to an equation $$t_{ij}^E = \frac{C_j}{f_{ij}}$$

to obtain minimum transmission time $t_{ij}^{E\ min} = \min\{t_{1j}^E, t_{2j}^E, t_{3j}^E \ldots t_{nj}^E\}$ for each of the computing task of the vehicle j;

matching maximum completion time for each of the computing tasks of the vehicle with time required by the nodes to compute the task, an equation for computing matching degrees $L_{ij}$ being $$L_{ij} = \frac{T_j^{max} - t_{ij}}{T_j^{max}},$$

wherein time $t_{ij}$ required to complete each of the tasks is computed according to an equation $$t_{ij} = \frac{D_j}{v_{ij}} + \frac{C_j}{f_{ij}};$$

and computing matching degrees with the distances $r_{ij}$ between the vehicle and the nodes and a maximum distance $r_{ij}^{max} = \max\{r_{1j}, r_{2j}, r_{3j} \ldots r_{nj}\}$ according to an equation $$R_{ij} = \frac{r_{ij}^{max} - r_{ij}}{r_{ij}^{max}}.$$

2. The method for selecting an optimal edge computing node in an IoV environment according to claim 1, wherein the assigning weights to different types of matching degrees in step 3 comprises:

respectively computing a mean and a variance for each of $D_j$, $C_j$, $T_j^{max}$ according to the properties $T_j = \{D_j, C_j, T_j^{max}\}j \in M$ of the computing tasks, wherein for the data volumes $D_j$ of the computing tasks and the numbers $C_j$ of CPU cycles required by the computing tasks, the $D_j$ and $C_j$ each have a demand degree $O_D$, $O_C$ of 3 if being greater than or equal to a sum of a mean and a variance thereof; the $D_j$ and $C_j$ each have a demand degree $O_D$, $O_C$ of 2 if being between the sum of the mean and the variance thereof and a difference between the mean and the variance thereof; and the $D_j$ and $C_j$ each have a demand degree $O_D$, $O_C$ of 1 if being less than or equal to the difference between the mean and the variance thereof wherien for the maximum time $T_j^{max}$ required to complete the tasks, the $T_j^{max}$ has a demand degree $O_T$ of 3 if being less than or equal to a difference between a mean and a variance thereof; the $T_j^{max}$ has a demand degree $O_T$ of 2 if being between a sum of the mean and the variance thereof and the difference between the mean and the variance thereof; and the $T_j^{max}$ has a demand degree $O_T$ of 1 if being greater than or equal to the sum of the mean and the variance thereof;

wherein distances toward base stations of the edge computing nodes for each of the computing tasks have a demand degree $O_R$ of 2;

$D_j$, $C_j$, $T_j^{max}$ respectively correspond to a transmission speed demand, an execution speed demand and a task completion time demand, with corresponding matching degrees of $J_{ij}$, $K_{ij}$, $L_{ij}$;

and after the demand degrees $O_D$, $O_C$, $O_T$, $O_R$ are obtained, weights $w_R$, $w_J$, $w_K$, $w_L$ are computed according to equations:

$$w_J = \frac{O_D}{O_D + O_C + O_T + O_R}$$

$$w_K = \frac{O_C}{O_D + O_C + O_T + O_R}$$

$$w_L = \frac{O_T}{O_D + O_C + O_T + O_R}$$

$$w_R = \frac{O_R}{O_D + O_C + O_T + O_R},$$

wherein $O_D$, $O_C$, $O_T$, $O_R$ respectively represent the transmission speed demand, the execution speed demand, the task completion time demand and the distance demand, and proportions of the $O_D$, $O_C$, $O_T$, $O_R$ in a total demand are the weights of the matching degrees $J_{ij}$, $K_{ij}$, $L_{ij}$, $R_{ij}$; and an equation for computing comprehensive matching degrees is:

$$Z_{ij} = R_{ij}w_R + J_{ij}w_J + K_{ij}w_K + L_{ij}w_L.$$

3. The method for selecting an optimal edge computing node in an IoV environment according to claim 2, wherein the comparing the comprehensive matching degrees in step 4 comprises:

matching each of the computing tasks of the vehicle with multiple edge computing nodes, assigning values to weights of different matching degrees, and computing multiple comprehensive matching degrees, wherein when the comprehensive matching degrees are compared, if only one maximum value is present among the comprehensive matching degrees for the computing task of the vehicle j, a node where the value is located is selected as an optimal edge computing node for the computing task of the vehicle j.

4. The method for selecting an optimal edge computing node in an IoV environment according to claim 3, wherein in the step 4, when the comprehensive matching degrees are compared, if two or more same maximum values are present among the computed comprehensive matching degrees, a comparison sequence for the matching degrees $J_{ij}$, $K_{ij}$, $L_{ij}$, $R_{ij}$ is determined according to the weights $w_R$, $w_J$, $w_K$, $w_L$, a matching degree having a larger weight is compared first, and a node having a largest matching degree is selected to execute the computing task.

5. A system for selecting an optimal edge computing node in an Internet of vehicle (IoV) environment, comprising:
a property acquisition module, configured to acquire properties of computing tasks of a vehicle in the IoV environment as well as properties of different edge computing nodes, wherein the properties of the computing tasks of the vehicle comprise: data volumes $D_j$ of the computing tasks, numbers $C_j$ of central processing unit (CPU) cycles required by the computing tasks, maximum time $T_j^{max}$ required to complete the tasks, and distances $r_{ij}$ between the vehicle and the nodes; and the properties of the edge computing nodes comprise: bandwidths $B_j$ of the edge computing nodes, percentages $b_{ij}$ of time slots allocated by the edge computing nodes to the vehicle in unit time, computing resources $f_{ij}$ allocated by the edge computing nodes to the vehicle, and average signal-to-noise ratios (SNRs)

$$\frac{S}{N}$$

after the edge computing nodes are connected to the vehicle;
a matching degree acquisition module, configured to compute matching degrees between the properties of the computing tasks of the vehicle and the properties of the edge computing nodes, wherein a data volume of each of the computing tasks of the vehicle is matched with the data transmission speeds of the edge computing nodes, and a number of CPU cycles required by each of the computing tasks of the vehicle is matched with the computing resources allocated by the edge computing nodes;
a comprehensive matching degree acquisition module, configured to analyze computing demands of different computing tasks, assign weights to different types of matching degrees, and compute comprehensive matching degrees; and
a comparison and selection module, configured to compare the comprehensive matching degrees acquired by the comprehensive matching degree acquisition module, and select an optimal edge computing node according to a comparison result to compute each of the computing tasks of the vehicle; wherein
the matching degree acquisition module comprises:
a first acquisition module, configured to match the data volume of each of the computing tasks of the vehicle with the data transmission speeds of the edge computing nodes, to obtain matching degrees $$J_{ij} = \frac{t_{ij}^{Smin}}{t_{ij}^S}, J_{ij} \in (0, 1)$$

between the data volume of each of the computing tasks of the vehicle and the data transmission speeds of the edge computing nodes,
wherein the data transmission speeds $v_{ij}$ of the edge computing nodes are computed according to an equation $$v_{ij} = b_{ij}v_j = b_{ij}B_j\log_2\left(1 + \frac{S}{N}\right);$$

and transmission time of all base stations for a data volume of each of computing tasks of a vehicle j is computed according to an equation $$t_{ij}^S = \frac{D_j}{v_{ij}}$$

to obtain minimum transmission time $t_{ij}^{S\,min}$ for each of the computing tasks of the vehicle j, with an equation of $t_{ij}^{S\,min}=\min\{t_{1j}^S, t_{2j}^S, t_{3j}^S \ldots t_{nj}^S\}$;
a second acquisition module, configured to match the number of CPU cycles required by each of the computing tasks of the vehicle with the computing resources allocated by the edge computing nodes, to obtain matching degrees $$K_{ij} = \frac{t_{ij}^{Emin}}{t_{ij}^E}, K_{ij} \in (0, 1)$$

between the number of CPU cycles required by the each of the computing tasks of the vehicle and the computing resources allocated by the edge computing nodes,
wherein execution time of all base stations for the data volume of each of the computing tasks of the vehicle j is computed according to an equation $$t_{ij}^E = \frac{C_j}{f_{ij}}$$

to obtain minimum transmission time $t_{ij}^{E\,min}=\min\{t_{1j}^E, t_{2j}^E, t_{3j}^E \ldots t_{nj}^E\}$ for each of the computing tasks of the vehicle j;
a third acquisition module, configured to match maximum completion time for each of the computing tasks of the vehicle with time required by the nodes to compute the task, an equation for computing matching degrees $L_{ij}$ being $$L_{ij} = \frac{T_j^{max} - t_{ij}}{T_j^{max}},$$

wherein time $t_{ij}$ required to complete each of the tasks is computed according to an equation $$t_{ij} = \frac{D_j}{v_{ij}} + \frac{C_j}{f_{ij}};$$

and
a fourth acquisition module, configured to compute matching degrees with the distances $r_{ij}$ between the vehicle and the nodes and a maximum distance $r_{ij}^{max} = \max\{r_{1j}, r_{2j}, r_{3j} \ldots r_{nj}\}$ according to an equation $$R_{ij} = \frac{r_{ij}^{max} - r_{ij}}{r_{ij}^{max}}.$$

6. The system for selecting an optimal edge computing node in an IoV environment according to claim 5, wherein in the matching degree acquisition module, the weights are assigned to the different types of matching degrees as follows:

respectively computing a mean and a variance for each of $D_j$, $C_j$, $T_j^{max}$ according to the properties $T_j = \{D_j, C_j, T_j^{max}\} j \in M$ of the computing tasks, wherein for the data volumes $D_j$ of the computing tasks and the numbers $C_j$ of CPU cycles required by the computing tasks, the $D_j$ and $C_j$ each have a demand degree $O_D$, $O_C$ of 3 if being greater than or equal to a sum of a mean and a variance thereof; the $D_j$ and $C_j$ each have a demand degree $O_D$, $O_C$ of 2 if being between the sum of the mean and the variance thereof and a difference between the mean and the variance thereof; and the $D_j$ and $C_j$ each have a demand degree $O_D$, $O_C$ of 1 if being less than or equal to the difference between the mean and the variance thereof;

wherein for the maximum time $T_j^{max}$ required to complete the tasks, the $T_j^{max}$ has a demand degree $O_T$ of 3 if being less than or equal to a difference between a mean and a variance thereof; the $T_j^{max}$ has a demand degree $O_T$ of 2 if being between a sum of the mean and the variance thereof and the difference between the mean and the variance thereof; and the $T_j^{max}$ has a demand degree $O_T$ of 1 if being greater than or equal to the sum of the mean and the variance thereof wherein distances toward base stations of the edge computing nodes for the computing tasks have a demand degree $O_R$ of 2;

$D_j$, $C_j$, $T_j^{max}$ respectively correspond to a transmission speed demand, an execution speed demand and a task completion time demand, with corresponding matching degrees of $J_{ij}$, $K_{ij}$, $L_{ij}$;

and after the demand degrees $O_D$, $O_C$, $O_T$, $O_R$ are obtained, weights $w_R$, $w_J$, $w_K$, $w_L$ are computed according to equations:

$$w_J = \frac{O_D}{O_D + O_C + O_T + O_R}$$

-continued $$w_K = \frac{O_C}{O_D + O_C + O_T + O_R}$$

$$w_L = \frac{O_T}{O_D + O_C + O_T + O_R}$$

$$w_R = \frac{O_R}{O_D + O_C + O_T + O_R},$$

wherein $O_D$, $O_C$, $O_T$, $O_R$ respectively represent the transmission speed demand, the execution speed demand, the task completion time demand and the distance demand, and proportions of the $O_D$, $O_C$, $O_T$, $O_R$ in a total demand are the weights of the matching degrees $J_{ij}$, $K_{ij}$, $L_{ij}$, $R_{ij}$; and an equation for computing comprehensive matching degrees is:

$$Z_{ij} = R_{ij}w_R + J_{ij}w_J + K_{ij}w_K + L_{ij}w_L.$$

7. The system for selecting an optimal edge computing node in an IoV environment according to claim 6, wherein in the comprehensive matching degree acquisition module, the comprehensive matching degrees are compared as follows:

matching each of the computing tasks of the vehicle with multiple edge computing nodes, assigning values to weights of different matching degrees, and computing multiple comprehensive matching degrees, wherein when the comprehensive matching degrees are compared, if only one maximum value is present among the comprehensive matching degrees for the computing task of the vehicle j, a node where the value is located is selected as an optimal edge computing node for the computing task of the vehicle j; and if two or more same maximum values are present among the computed comprehensive matching degrees, a comparison sequence for the matching degrees $J_{ij}$, $K_{ij}$, $L_{ij}$, $R_{ij}$ is determined according to the weights $w_R$, $w_J$, $w_K$, $w_L$, a matching degree having a larger weight is compared first, and a node having a largest matching degree is selected to execute the computing task.

8. The system for selecting an optimal edge computing node in an IoV environment according to claim 5, wherein each of the edge computing nodes is provided with one base station; base stations of different edge computing nodes are connected in a wired manner; and the vehicle communicates with the base stations through time division multiple address (TDMA).

* * * * *